US009686516B2

(12) United States Patent
Tocze et al.

(10) Patent No.: US 9,686,516 B2
(45) Date of Patent: Jun. 20, 2017

(54) METHOD AND DEVICE FOR IMPROVING CONFIGURATION OF COMMUNICATION DEVICES IN A VIDEO PROJECTION SYSTEM COMPRISING MULTIPLE WIRELESS VIDEO PROJECTORS

(71) Applicant: CANON KABUSHIKI KAISHA, Tokyo (JP)

(72) Inventors: Lionel Tocze, Saint Domineuc (FR); Pierre Visa, Rennes (FR); Pascal Lagrange, La Chapelle des Fougeretz (FR)

(73) Assignee: Canon Kabushiki Kaisha, Tokyo (JP)

( * ) Notice: Subject to any disclaimer, the term of this patent is extended or adjusted under 35 U.S.C. 154(b) by 558 days.

(21) Appl. No.: 13/828,749

(22) Filed: Mar. 14, 2013

(65) Prior Publication Data
US 2013/0258209 A1  Oct. 3, 2013

(30) Foreign Application Priority Data
Mar. 28, 2012 (GB) .................................. 1205475.5

(51) Int. Cl.
| | |
|---|---|
| *H04N 9/31* | (2006.01) |
| *H04N 9/12* | (2006.01) |
| *G01S 1/00* | (2006.01) |
| *H04W 84/20* | (2009.01) |

(52) U.S. Cl.
CPC ............. *H04N 9/31* (2013.01); *H04N 9/3147* (2013.01); *G01S 1/00* (2013.01); *H04N 9/12* (2013.01); *H04W 84/20* (2013.01)

(58) Field of Classification Search
CPC .. H04N 9/31; H04N 9/12; G01S 1/00; H04W 8/20
See application file for complete search history.

(56) References Cited

U.S. PATENT DOCUMENTS

| | | | | |
|---|---|---|---|---|
| 2006/0013185 A1* | 1/2006 | Seo et al. | ...................... | 370/343 |
| 2007/0088780 A1* | 4/2007 | Sato et al. | ...................... | 709/204 |
| 2008/0100805 A1 | 5/2008 | Majumder et al. | | |
| 2008/0129894 A1* | 6/2008 | Kang et al. | ..................... | 348/758 |
| 2008/0159225 A1* | 7/2008 | Kim et al. | ..................... | 370/331 |
| 2008/0259861 A1* | 10/2008 | Kang et al. | ................... | 370/329 |

(Continued)

FOREIGN PATENT DOCUMENTS

| | | |
|---|---|---|
| WO | WO2008051958 A2 | 5/2008 |
| WO | WO2010144610 A1 | 12/2010 |

*Primary Examiner* — Alpus H Hsu
*Assistant Examiner* — Anthony Luo
(74) *Attorney, Agent, or Firm* — Canon U.S.A., Inc. IP Division

(57) ABSTRACT

The present invention relates to improving configuration of wireless communication paths between devices in a video projection system comprising multiple wireless video projectors. When an initial radio communication setup is required between a managing node, e.g. a node comprising a master projector, and a node comprising a slave projector, for example following the powering up of the video projection system, the slave node receives setup information by radio communication means according to a sweeping sequence and transmits information by projecting sub-images. Sub-images advantageously comprise information relative to settings of the master node allowing reception in the corresponding slave node of a radio signal transmitted by the master node.

35 Claims, 5 Drawing Sheets

(56) References Cited

U.S. PATENT DOCUMENTS

| | | |
|---|---|---|
| 2010/0103379 A1 | 4/2010 | Fiess |
| 2011/0122849 A1* | 5/2011 | Jain et al. ......... H04W 74/0808 370/336 |
| 2011/0228104 A1* | 9/2011 | Nelson .......................... 348/190 |
| 2011/0285474 A1* | 11/2011 | Ali ................................. 333/33 |
| 2012/0091204 A1* | 4/2012 | Shi ............................... 235/437 |
| 2012/0242910 A1* | 9/2012 | Ivashin ......................... 348/745 |

* cited by examiner

METHOD AND DEVICE FOR IMPROVING CONFIGURATION OF COMMUNICATION DEVICES IN A VIDEO PROJECTION SYSTEM COMPRISING MULTIPLE WIRELESS VIDEO PROJECTORS

This application claims the benefit under 35 U.S.C. §119 (a)-(d) of United Kingdom Patent Application No. 1205475.5, filed on Mar. 28, 2012 and entitled "Method and device for improving configuration of communication devices in a video projection system comprising multiple wireless video projectors". The above cited patent application is incorporated herein by reference in its entirety.

FIELD OF THE INVENTION

The present invention relates generally to video projection and more specifically to a method and a device for improving configuration of communication devices in a video projection system comprising multiple wireless video projectors.

BACKGROUND OF THE INVENTION

Videos are generally projected as sequences of images on a video screen by a video projection system composed of a single video projector or multiple video projectors generating adjacent, partially overlapping sub-images. Projected images can be of a standard definition or of a high definition (HD), offering high image quality.

When the video projection system used comprises multiple video projectors, each single video projector generates a sub-image with a given definition and a size determined by the video projector lens focal length, the size of the video projector's light modulation device (e.g. an LCD panel), and the distance between the video projector and the video screen.

Covering efficiently, in terms of brightness, a very large projection screen with the required definition usually requires aggregating several sub-images in a manner that they cover adjacent, partially overlapping zones of the full screen area. In the overlapping zones, blending ensures a smooth transition between sub-images projected by different video projectors in a manner that is tolerant of small displacements introduced, for example, by vibrations or thermal expansion. Blending is a well-known technique that consists in continuously decreasing the brightness of sub-images generated by a video projector towards the border of the projection zone covered by that video projector and complementarily increasing the sub-image brightness of sub-images generated by adjacent video projectors in a manner to obtain uniform brightness after superposition.

The partitioning and blending of sub-images to be projected by a video projection system comprising multiple video projectors have to be carefully adjusted to give the user the impression of a single image throughout the whole projection screen area. To that end, each video projector of a video projection system comprising multiple video projectors is set up so as to control, in particular, overlapping and blending of areas of the projected sub-images.

Such a set up typically requires exchanges of information between the projectors of the system. To that end, communication links must be established between the projectors, for example, according to a centralized scheme, between a server or master projector and each of the other projectors, typically referred to as slave projectors. Such communication links can also be used for transmitting video streams from the server or master projector to the slave projectors.

When wireless communication links are used, an initial discovery phase is generally conducted to identify radio communication paths to be used. It is noted here that for the sake of efficiency, each of the communication devices used in a wireless system, that is typically associated with each video projector, may comprise several antennas, for example several directional antennas, and/or several antenna settings, the antenna(s) being emitting antenna(s), receiving antenna(s), or mixed antenna(s). As a consequence, there commonly exist several communication paths between two communication devices.

A main issue such as an initial discovery phase has to deal with is radio interference and data collision that generally slows down the overall system setup.

Using state of the art wireless technology like CSMA-CA (acronym for Carrier-Sense Multiple Access-Collision Avoidance), discovering communication paths between projectors is subject to collision problems when using wide antennas and is longer when using directional antennas for performing transmission.

Indeed, in case of wide antenna transmission, several projectors may try to access a wireless medium simultaneously, leading to collision of the radio transmission requests. Accordingly, several access attempts are required to correctly set up a communication path.

Regarding directional antennas, discovery protocols generally require the use of a reception feedback channel. A waiting time is required for reception antenna sweeping for each directional antenna used plus additional waiting time for enabling the receiving communication devices to get access to the wireless channel and send feedback information to the source communication device. This is done without any guarantee that this time is practically used for transmitting feedback data since it may occur that a receiving communication device is not able to receive any signal from the emitting antenna of the source communication device.

There exist other methods for setting up video systems comprising several video projectors such as the one described in U.S. Pat. No. 7,942,530 that addresses, in particular, automatic identification of parts of video images each projector has to display. According to U.S. Pat. No. 7,942,530, the main video signal is transmitted to all the projectors used through a wired connection (star topology), each projector having its own camera to capture its own display and part of the surrounding area displayed by neighboring projectors. Each projector is therefore able to capture data through its camera and share items of information by projecting them as parts of images since a communication channel is initially available between communication devices, enabling setup of the system.

Accordingly, there is a need to improve the setup of video projection systems comprising multiple wireless video projectors, in particular when initial communication paths are not available.

In particular, there is a need for establishing wireless communication channels while avoiding collision disturbance and the use of a contention-based access mechanism whatever the number of slave projectors in the video system.

Furthermore, it would be desirable to enable transmission of feedback data between communication devices during discovery phases.

SUMMARY OF THE INVENTION

Faced with these constraints, the inventors provide a method and a device for improving configuration of communication devices in a video projection system comprising multiple wireless video projectors.

It is a broad object of the invention to remedy the shortcomings of the prior art as described above.

Accordingly, it would be desirable to provide a method for configuring a wireless communication path between a master node and at least one slave node in a projection system for projecting a video stream on a projection area, comprising a plurality of video projectors, each of the master node and at least one slave node comprising at least one wireless communication module and at least one video projector of the plurality of video projectors, the method comprising the following steps:

emitting a radio signal, from the master node, comprising at least one item of information characterizing at least one parameter of the at least one wireless communication module of the master node;

obtaining, in the master node, an image of the projection area;

analysing, in the master node, the obtained image to determine whether the obtained image comprises at least a representation of the at least one item of information;

in response to the analysing step, retrieving, in the master node, the at least one item of information; and setting up the at least one wireless communication module of the master node as a function of the at least one item of information to configure a wireless communication path between the master node and the at least one slave node.

Accordingly, wireless communication paths between a master node and slave nodes can be established quickly, without requiring the use of contention-based access mechanisms and without collision disturbance, even if the projection system comprises a huge number of projectors. Moreover, a master node can obtain feedback information from slave nodes even though no medium access scheme has yet been defined. A wireless communication path can be established from the master node to a slave node after the latter received a radio signal from the master node and projected a sub-image comprising feedback information, the wireless communication path being established as a function of the feedback information. The use of sub-images containing a feedback information simplifies and shortens the configuration of wireless communication paths. Since an image displayed by a projection system comprising several projectors comprises several sub-images projected by different projectors, it is possible to configure simultaneously and reliably several wireless communication paths without perturbation.

According to a particular embodiment, the method further comprises a step of modifying the at least one parameter of the at least one wireless communication module of the master node if the obtained image does not comprise the at least a representation of the at least one item of information and a step of repeating the steps of emitting a radio signal, obtaining an image, and analysing the obtained image. Accordingly, several settings can be determined to allow identification of those allowing the establishment of wireless communication paths.

The step of obtaining an image of the projection area can be carried out following a predetermined time period after the step of emitting the radio signal is carried out. Accordingly, a slave node has time to test several settings for receiving the radio signal emitted by the master node.

According to a particular embodiment, the method further comprises the initial steps of:

obtaining, in the master node, an image of the projection area;

analysing, in the master node, the obtained image to identify a number of slave nodes of the projection system, the steps of emitting a radio signal, retrieving the at least one item of information, and setting up the at least one wireless communication module of the master node being carried out for each identified slave node of the projection system.

Accordingly, the master node can determine the number of slave nodes in the projection system and manage the configuration of wireless communication paths so as to configure one wireless communication path for each slave node.

Still according to a particular embodiment, the method further comprises a step of setting up the wireless communication module of the master node according to the at least one parameter, the step of setting up the wireless communication module according to the at least one parameter being carried out before the step of emitting the radio signal. Therefore, several settings can be tested to identify those allowing the establishment of wireless communication paths.

The at least one parameter of the at least one wireless communication module of the master node comprises for example a position of an emitting antenna.

The radio signal can further comprise an identifier of the master node to avoid any disturbance in an environment comprising several emitting devices, for example several master nodes.

It would be also desirable to provide a method for configuring a wireless communication path between a master node and at least one slave node in a projection system for projecting a video stream on a projection area, comprising a plurality of video projectors, each of the master node and at least one slave node comprising at least one wireless communication module and at least one video projector of the plurality of video projectors, the method comprising the following steps:

receiving a radio signal from the master node, in the at least one slave node, via a wireless communication module of the at least one slave node, the radio signal comprising at least one item of information characterizing the wireless communication module of the master node;

upon reception of the radio signal, creating, in the at least one slave node, a sub-image comprising at least a representation of the at least one item of information; and displaying the created sub-image.

Accordingly, wireless communication paths between a master node and slave nodes can be established quickly, without requiring the use of contention-based access mechanisms and without collision disturbance, even if the projection system comprises a huge number of slave nodes. Moreover, a master node can obtain feedback information from slave nodes even though no medium access scheme has yet been defined. A wireless communication path can be established from the master node to a slave node after the latter received a radio signal from the master node and projected a sub-image comprising feedback information, the wireless communication path being established as a function of the feedback information. The use of sub-images containing a feedback information simplifies and shortens the configuration of wireless communication paths. Since an image displayed by a projection system comprising several projectors comprises several sub-images projected by different projectors, it is possible to configure simultaneously and reliably several wireless communication paths without perturbation.

According to a particular embodiment, the method further comprises a step of modifying at least one setting of the wireless communication module of the at least one slave node and a step of attempting receiving the radio signal. Therefore, several settings can be tested to identify those allowing receiving the radio signal. Modifying at least one setting of the wireless communication module of the at least one slave node can be repeated according to a sweeping sequence.

Still according to particular embodiments, the at least one setting of the wireless communication module of the at least one slave node to be used can be either the first one selected allowing receiving the radio signal with a strength that reaches a predetermined threshold, either that allowing the best reception of the radio signal. The at least one setting of the wireless communication module of the at least one slave node can comprise a position of a receiving antenna.

According to a particular embodiment, the step of creating the sub-image can comprise a step of creating in the created sub-image a representation of an identifier of the at least one slave node allowing its identification in a displayed image.

It would be also desirable to provide a method for configuring a wireless communication path between a master node and at least one slave node in a projection system for projecting a video stream on a projection area, comprising a plurality of video projectors, each of the master node and at least one slave node comprising at least one wireless communication module and at least one video projector of the plurality of video projectors, the method comprising the following steps:

emitting a radio signal, from the master node, comprising at least one item of information characterizing at least one parameter of the at least one wireless communication module of the master node;
  receiving the radio signal from the master node, in the at least one slave node, via a wireless communication module of the at least one slave node;
  upon reception of the radio signal, creating, in the at least one slave node, a sub-image comprising at least a representation of the at least one item of information;
  displaying the created sub-image on the projection area;
  obtaining, in the master node, an image of the projection area;
  analysing, in the master node, the obtained image to determine whether the obtained image comprises at least a representation of the at least one item of information;
  in response to the analysing step, retrieving, in the master node, the at least one item of information; and
  setting up the at least one wireless communication module of the master node as a function of the at least one item of information to configure a wireless communication path between the master node and the at least one slave node.

Accordingly, wireless communication paths between a master node and slave nodes can be established quickly, without requiring the use of contention-based access mechanisms and without collision disturbance, even if the projection system comprises a huge number of projectors. Moreover, a master node can obtain feedback information from slave nodes even though no medium access scheme has yet been defined. A wireless communication path can be established from the master node to a slave node after the latter received a radio signal from the master node and projected a sub-image comprising feedback information, the wireless communication path being established as a function of the feedback information. The use of sub-images containing a feedback information simplifies and shortens the configuration of wireless communication paths. Since an image displayed by a projection system comprising several projectors comprises several sub-images projected by different projectors, it is possible to configure simultaneously and reliably several wireless communication paths without perturbation.

According to a particular embodiment, the method further comprises a step of modifying the at least one parameter of the at least one wireless communication module of the master node if the obtained image does not comprise the at least a representation of the at least one item of information and a step of repeating the steps of emitting a radio signal, obtaining an image, and analysing the obtained image. Accordingly, several settings can be determined to allow identification of those allowing the establishment of wireless communication paths.

Still according to a particular embodiment, the method further comprises a step of modifying at least one setting of the wireless communication module of the at least one slave node and a step of attempting receiving the radio signal. Therefore, several settings can be tested to identify those allowing receiving the radio signal.

According to a particular embodiment, the step of obtaining an image in the master node is carried out after a predetermined period of time. Accordingly, a slave node has time to test several settings for receiving the radio signal emitted by the master node.

According to particular embodiments, at least one sub-image displayed on the projection area comprises a representation of an identifier of the slave node that projected the at least one displayed sub-image and at least one sub-image displayed on the projection area comprises codes representing at least the at least one item of information, the step of retrieving, in the master node, the at least one item of information comprising a step of decoding the codes. The codes can be codes of the barcode type.

Still according to a particular embodiment, the method further comprises a step of transmitting sub-images from the master node to each of the at least one slave node using initiated wireless communication paths to project a composite image on the projection area.

The at least one parameter of the at least one wireless communication module of the master node can comprise a position of an emitting antenna.

The radio signal can further comprise an identifier of the master node to avoid any disturbance in an environment comprising several emitting devices, for example several master nodes.

It would be also desirable to provide an apparatus for configuring a wireless communication path between a master node and at least one slave node in a projection system for projecting a video stream on a projection area, comprising a plurality of video projectors, each of the master node and at least one slave node comprising at least one wireless communication module and at least one video projector of the plurality of video projectors, the apparatus comprising processing means configured for carrying out the steps of:
  emitting a radio signal, from the master node, comprising at least one item of information characterizing at least one parameter of the at least one wireless communication module of the master node;

obtaining, in the master node, an image of the projection area;

analysing, in the master node, the obtained image to determine whether the obtained image comprises at least a representation of the at least one item of information;

in response to the analysing step, retrieving, in the master node, the at least one item of information; and setting up the at least one wireless communication module of the master node as a function of the at least one item of information to configure a wireless communication path between the master node and the at least one slave node.

Accordingly, wireless communication paths between a master node and slave nodes can be established quickly, without requiring the use of contention-based access mechanisms and without collision disturbance, even if the projection system comprises a huge number of projectors. Moreover, a master node can obtain feedback information from slave nodes even though no medium access scheme has yet been defined. A wireless communication path can be established from the master node to a slave node after the latter received a radio signal from the master node and projected a sub-image comprising feedback information, the wireless communication path being established as a function of the feedback information. The use of sub-images containing a feedback information simplifies and shortens the configuration of wireless communication paths. Since an image displayed by a projection system comprising several projectors comprises several sub-images projected by different projectors, it is possible to configure simultaneously and reliably several wireless communication paths without perturbation.

According to a particular embodiment, the processing means are further configured for carrying out a step of modifying the at least one parameter of the at least one wireless communication module of the master node if the obtained image does not comprise the at least a representation of the at least one item of information and a step of repeating the steps of emitting a radio signal, obtaining an image, and analysing the obtained image. Accordingly, several settings can be determined to allow identification of those allowing the establishment of wireless communication paths.

Still according to a particular embodiment, the processing means are further configured for carrying out a step of waiting for a predetermined time period after the step of emitting the radio signal is carried out before carrying out the step of obtaining an image of the projection area. Accordingly, a slave node has time to test several settings for receiving the radio signal emitted by the master node.

According to a particular embodiment, the processing means are further configured for carrying out the initial steps of:

obtaining, in the master node, an image of the projection area;

analysing, in the master node, the obtained image to identify a number of slave nodes of the projection system, the steps of emitting a radio signal, retrieving the at least one item of information, and setting up the at least one wireless communication module of the master node being carried out for each identified slave node of the projection system.

Accordingly, the master node can determine the number of slave nodes in the projection system and manage the configuration of wireless communication paths so as to configure one wireless communication path for each slave node.

Still according to a particular embodiment, the processing means are further configured for carrying out a step of setting up the wireless communication module of the master node according to the at least one parameter, the step of setting up the wireless communication module according to the at least one parameter being carried out before the step of emitting the radio signal. Therefore, several settings can be tested to identify those allowing the establishment of wireless communication paths.

It would be also desirable to provide an apparatus for configuring a wireless communication path between a master node and at least one slave node in a projection system for projecting a video stream on a projection area, comprising a plurality of video projectors, each of the master node and at least one slave node comprising at least one wireless communication module and at least one video projector of the plurality of video projectors, the apparatus comprising processing means configured for carrying out the steps of:

receiving a radio signal from the master node, in the at least one slave node, via a wireless communication module of the at least one slave node, the radio signal comprising at least one item of information characterizing the wireless communication module of the master node;

upon reception of the radio signal, creating, in the at least one slave node, a sub-image comprising at least a representation of the at least one item of information; and displaying the created sub-image.

Accordingly, wireless communication paths between a master node and slave nodes can be established quickly, without requiring the use of contention-based access mechanisms and without collision disturbance, even if the projection system comprises a huge number of slave nodes. Moreover, a master node can obtain feedback information from slave nodes even though no medium access scheme has yet been defined. A wireless communication path can be established from the master node to a slave node after the latter received a radio signal from the master node and projected a sub-image comprising feedback information, the wireless communication path being established as a function of the feedback information. The use of sub-images containing a feedback information simplifies and shortens the configuration of wireless communication paths. Since an image displayed by a projection system comprising several projectors comprises several sub-images projected by different projectors, it is possible to configure simultaneously and reliably several wireless communication paths without perturbation.

According to a particular embodiment, the processing means are further configured for carrying out a step of modifying at least one setting of the wireless communication module of the at least one slave node and a step of attempting receiving the radio signal. Therefore, several settings can be tested to identify those allowing receiving the radio signal.

Still according to a particular embodiment, the processing means are further configured for carrying out a step of estimating strength of a received radio signal.

It would be also desirable to provide a system for configuring a wireless communication path between a master node and at least one slave node in a projection system for projecting a video stream on a projection area, comprising a plurality of video projectors, each of the master node and at least one slave node comprising at least one wireless communication module and at least one video projector of the plurality of video projectors, the system comprising processing means configured for carrying out the steps of:

emitting a radio signal, from the master node, comprising at least one item of information characterizing at least one parameter of the at least one wireless communication module of the master node;

receiving the radio signal from the master node, in the at least one slave node, via a wireless communication module of the at least one slave node;

upon reception of the radio signal, creating, in the at least one slave node, a sub-image comprising at least a representation of the at least one item of information;

displaying the created sub-image on the projection area;

obtaining, in the master node, an image of the projection area;

analysing, in the master node, the obtained image to determine whether the obtained image comprises at least a representation of the at least one item of information;

in response to the analysing step, retrieving, in the master node, the at least one item of information; and setting up the at least one wireless communication module of the master node as a function of the at least one item of information to configure a wireless communication path between the master node and the at least one slave node.

Accordingly, wireless communication paths between a master node and slave nodes can be established quickly, without requiring the use of contention-based access mechanisms and without collision disturbance, even if the projection system comprises a huge number of projectors. Moreover, a master node can obtain feedback information from slave nodes even though no medium access scheme has yet been defined. A wireless communication path can be established from the master node to a slave node after the latter received a radio signal from the master node and projected a sub-image comprising feedback information, the wireless communication path being established as a function of the feedback information. The use of sub-images containing a feedback information simplifies and shortens the configuration of wireless communication paths. Since an image displayed by a projection system comprising several projectors comprises several sub-images projected by different projectors, it is possible to configure simultaneously and reliably several wireless communication paths without perturbation.

According to a particular embodiment, the processing means are further configured for carrying out a step of modifying the at least one parameter of the at least one wireless communication module of the master node if the obtained image does not comprise the at least a representation of the at least one item of information and a step of repeating the steps of emitting a radio signal, obtaining an image, and analysing the obtained image. Accordingly, several settings can be determined to allow identification of those allowing the establishment of wireless communication paths.

Still according to a particular embodiment, the processing means are further configured for carrying out a step of modifying at least one setting of the wireless communication module of the at least one slave node and a step of attempting receiving the radio signal. Therefore, several settings can be tested to identify those allowing receiving the radio signal.

BRIEF DESCRIPTION OF THE DRAWINGS

Further advantages of the present invention will become apparent to those skilled in the art upon examination of the drawings and detailed description. It is intended that any additional advantages be incorporated herein.

FIG. 3, comprising

DETAILED DESCRIPTION OF EMBODIMENTS OF THE INVENTION

For the sake of clarity below, an image or a video image refers to an image displayed on a video screen by a video system comprising several video projectors (also referred to as projectors) while a sub-image is an image projected by a single projector of a video system.

The invention aims at allowing the establishment of wireless communication channels enabling video signal transmission between communications devices of a video system, wherein directional antennas may be used. To that end, feedback information is transmitted from a projector to another device by projecting sub-images comprising a representation of the feedback information to be transmitted. Capturing and analyzing the projected sub-images allow the device to retrieve the feedback information.

Figure 1:
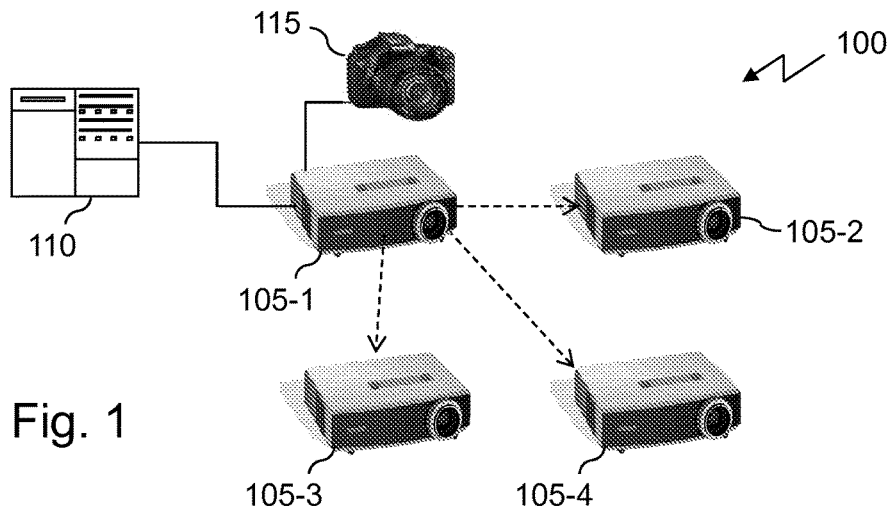
FIG. 1 schematically represents an example of a video projection system comprising multiple video projectors for displaying video.

FIG. 1 illustrates a video projection system 100 comprising a plurality of video projectors 105-1 to 105-4. Each video projector is provided with a wireless communication device (not represented) to form a node of a communication network in the video projection system. In a particular embodiment, the represented video projection system can display high quality video images, for example 4k2k video (which means images having a size of 3840×2160 pixels), on a large projection area, using common high definition (HD) video projectors, for example video projectors that are of the 1080p HD video standard for displaying images of 1920×1080 pixels.

According to the video projection system depicted in FIG. 1, the full format video stream to be displayed, comprising images of the 4k2k format, preferably raw images, is provided by a video source device 110. The full format video stream may be stored in the video source device 110 or received from another device (not represented). In the given embodiment, video source device 110 is responsible for splitting up the full format video stream into video streams of sub-images, also referred to as video sub-streams, for example HD video sub-streams, to be displayed by each projector and for managing blending areas as described by reference to FIG. 3a in order to compensate for chrominance and luminance variation between the video projectors used so that the displayed images appear like a single image issued from a single projector.

According to the disclosed embodiment depicted in FIG. 1, the full format video stream issued by the video source device 110 is split up into four video sub-streams. These sub-streams are transmitted to one node of the video projection system, referred to as the master node, which preferably comprises a master projector 105-1, via a first communication link that may consist, for example, of four wired HDMI (acronym for High-Definition Multimedia Interface) links or a specific wireless connection able to sustain the high data bit rate of HD video streams without any degradation. Still according to the disclosed embodiment shown in FIG. 1, the master node comprising the master projector 105-1 transmits each video sub-stream to a slave node comprising a slave projector of the video projection system, that is to say to video projectors 105-2 to 105-4, via wireless communication channels represented by dashed arrows.

In the given video projection system, wireless connections between projectors are based on 60 GHz wireless technology that is able to provide several Gbps data throughput. Accordingly, raw HD video streams can be exchanged without any need for compression technology.

The video projection system further comprises an image acquisition device 115, for example a camera, that is connected to a node of the video projection system and enables the capture of the full projection display area of the video projection system. According to the disclosed embodiment depicted in FIG. 1, the image acquisition device 115 is connected to the master node comprising the master projector 105-1 via a wire link. However, a wireless link can also be used.

Figure 2A:
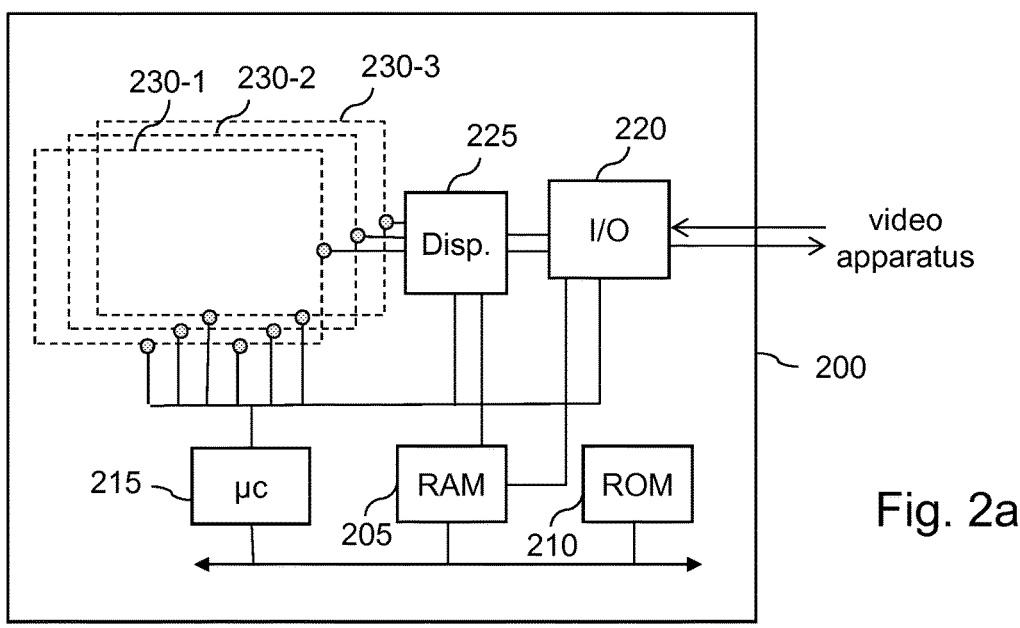
FIG. 2, comprising FIGS. 2a and 2b, schematically illustrates an example of the structure of a wireless communication device that is provided with each video projector of the video projection system illustrated in FIG. 1.
Figure 2B:
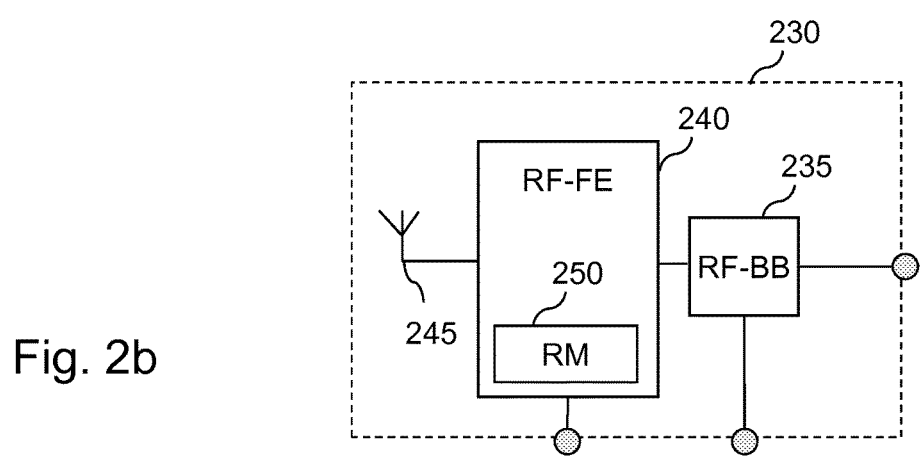

FIG. 2, comprising FIGS. 2a and 2b, illustrates schematically an example of the structure of a wireless communication device 200 that is provided with each video projector of the video projection system 100 to form a node. While FIG. 2a represents a general view of this structure, FIG. 2b illustrates a detailed view of an element of the wireless communication device represented in FIG. 2a.

As illustrated in FIG. 2a, the wireless communication device 200 comprises:
- a RAM (acronym for Random Access Memory) 205 working as a main memory;
- a ROM (acronym for Read-Only Memory) 210;
- a CPU (acronym for Central Processing Unit) or more generally a computation block 215 (denoted µc for microcontroller) whose capacity can be extended by an optional random access memory connected to an extension port (not shown). The microcontroller 215 is capable of executing booting instructions stored in the ROM 210. After the system has been powered up, the microcontroller 215 is capable of executing instructions pertaining to a computer program from the RAM 205. These computer program instructions are typically loaded in the RAM 205 from ROM 210 or an external memory (not shown). Such a computer program, if executed by the microcontroller 215, prompts the execution of a part or the totality of the steps of the algorithms described herein below;
- an input/output (I/O) interface 220 that is connected to a video apparatus, the video apparatus being either a video source or a video display/projector, for example via an HDMI cable;
- a dispatch video module 225 for transmitting a video sub-stream received from the I/O interface 220, intended for a particular slave node, to a receiver/transmitter module to which it is connected, that is configured to transmit data to that particular slave node (in the case where module 225 is implemented in the master node) or for receiving a video sub-stream from a receiver/transmitter module to which it is connected and transmitting the received video sub-stream to the I/O interface 220 (in the case where module 225 is implemented in a slave node); and
- one or several receiving/transmitting modules 230-1 to 230-3, also called wireless communication modules, enabling reception/transmission of radio signals in order to exchange control data and video sub-streams after setting up communication paths. According to a particular embodiment, a slave node comprises only one wireless communication module for receiving a video sub-stream while the master node comprises as many wireless communication modules as there are slave projectors (as shown in FIG. 2a). It is to be noted that the number of wireless communication modules in the master node can be smaller than the number of slave nodes according to a particular video stream distribution scheme. According to another particular embodiment, slave and master nodes have the same configuration and thus comprise the same number of wireless communication modules. Such an embodiment increases flexibility for video projector system settings since the same hardware can be used for each type of nodes (the master node is identified as such by source connection detection). Each wireless communication module of the master node is preferably connected to at least one dedicated transmission antenna whose settings, typically comprising position and/or channel frequency settings, are determined from a set of predetermined settings, each being characterized by an identifier.

As illustrated in FIG. 2b, each transmitter/receiver module 230-1 to 230-3, generically referred to as 230, comprises
- a radio frequency baseband block 235 (denoted RF-BB) that is responsible for modulating and demodulating digital data exchanged between the dispatch video module 225 and a radio frequency front-end block 240;
- a radio frequency front-end block 240 (denoted RF-FE) responsible for matching the output signal of the radio frequency baseband block 235 before it is sent out by means of an antenna 245. For the sake of illustration, the matching can be done by frequency transposition and power amplification processes. Conversely, radio frequency front-end block 240 also enables the matching of a signal received by the antenna 245 before it is transmitted to the radio frequency baseband block 235. According to the illustrated embodiment, the radio frequency front-end block 240 comprises a reception measurement block 250 (denoted RM) that includes, for example, an analog-digital converter (also known as ADC) whose main task is to measure the strength of the signal received through the antenna 245, the measured value next being communicated to the microcontroller 215; and
- the antenna 245 that is able to support multiple configuration such as being configured as an omnidirectional antenna or a directional beam antenna having configurable horizontal/vertical directions. The antenna 245 may be a single configurable antenna or a set of antennas having different characteristics.

Figure 3A:
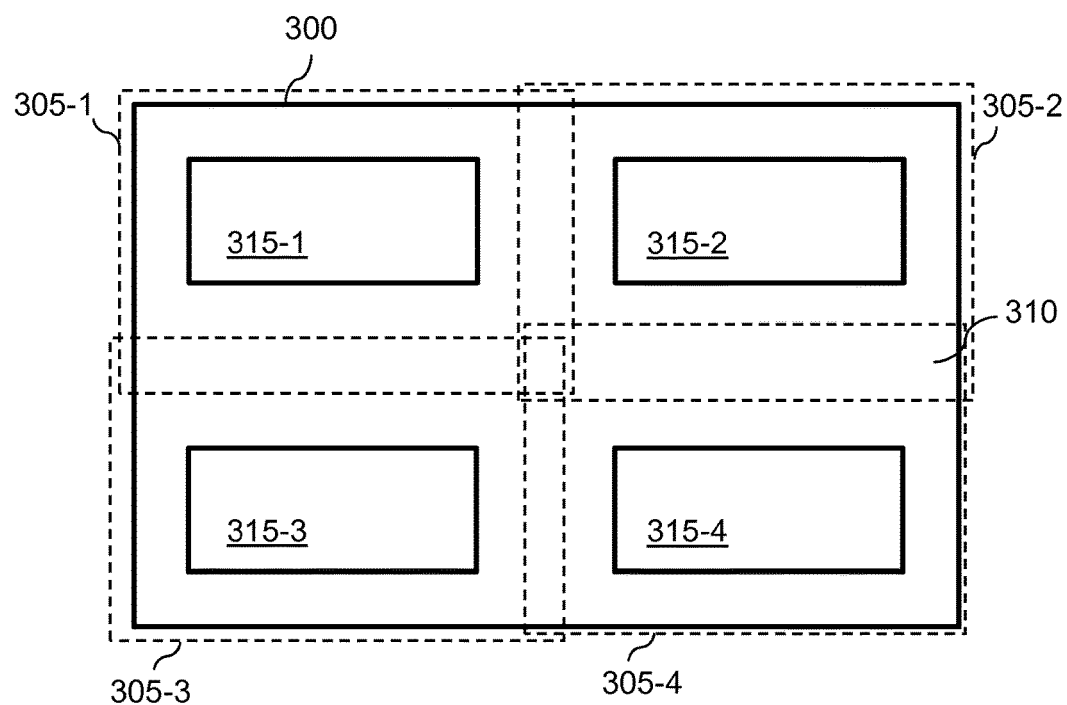
FIG. 3a and FIG. 3b, illustrates an example of the projection area of the video projection system illustrated in FIG. 1.
Figure 3B:
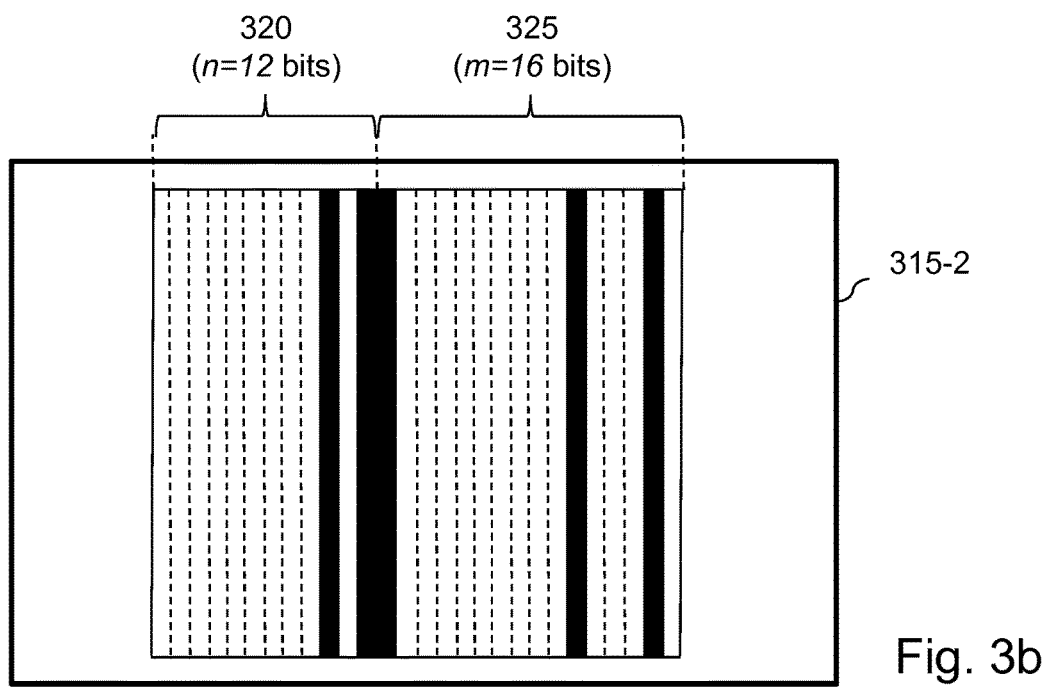

FIG. 3, comprising FIG. 3a and FIG. 3b, illustrates an example of the projection area 300 of the video projection system depicted in FIG. 1. While FIG. 3a represents a general view of the projection area, FIG. 3b illustrates part of a sub-image projected by a projector of the video projection system depicted in FIG. 1.

As illustrated, each projector 105-1 to 105-4 respectively projects a sub-image in a corresponding display sub-area denoted 305-1 to 305-4 which approximately corresponds to a quarter of a full 4k2k projected image. As described herein above, overlapping and blending areas of neighboring projected sub-images are created. These overlapping and blending areas allow color adjustments and distortion corrections between the projected sub-images. According to the illustrated embodiment, such adjustments and corrections are managed by the video source device 110 using, for example, images obtained from the image acquisition device 115 or by using preconfigured settings. For the sake of illustration, area 310 is the overlapping and blending area corresponding to sub-images projected by projectors 105-2 and 105-4, that is to say between sub-images projected in sub-areas 305-2 and 305-4.

To avoid any error during the initial radio communication setup, these overlapping and blending areas should be avoided during that stage. Accordingly, only the central portions of the projection sub-areas, denoted 315-1 to 315-4, are used by the projectors of the video projection system, during the initial radio communication setup, to transmit feedback information in the form of video feedback signals.

The sub-images displayed on the display area 300 can be obtained by the image acquisition device 115 as a single image whose analysis enables detection of the presence of slave nodes and the obtaining of feedback information. Alternatively, several image acquisition devices may be used, for example one per potential projected sub-image.

FIG. 3b illustrates an example of coding feedback information in a sub-image, for example a sub-image displayed in the sub-area 315-2. As described here after by reference to FIG. 4, such a sub-image (or video feedback signal) is projected by a slave projector when an initial path communication is detected. The feedback information may comprise several items of information that may be encoded as patterns in different fields of the corresponding sub-image. For the sake of illustration, the sub-image displayed in the sub-area 315-2 may contain the two following information fields 320 and 325:

an identifier of the projector or node (information field 320) projecting the sub-image comprising that information. It can be coded over n bits, for example 12 bits as illustrated in FIG. 3b (bearing in mind that 2 bits would be enough for the given example to identify each of the four nodes). This information enables the master node, or more generally a managing node receiving images of the projection area, to identify which node and projector transmit the displayed feedback information; and
  transmission antenna settings of the master node that the corresponding slave node is able to cope with during initial radio communication setup (information field 325). It can be coded over m bits, for example 16 bits as depicted in FIG. 3b. This enables the master node to know which antenna settings must be used for communicating with the corresponding slave node. It is noted here that an antenna position is preferably part of the settings. The latter may also comprise other information such as a channel frequency and a master node identifier.

The items of information coded in these information fields can be coded using codes of the barcode type as depicted in FIG. 3b.

According to the example illustrated in FIG. 3b, the binary value of the projector or node identifier is 000000000101 (assuming that white color corresponds to logical value 0 and black color corresponds to logical value 1) which is the decimal value 5. Similarly, the binary value of the transmission antenna settings of the master node is 1000000000100010 (still assuming that white color corresponds to logical value 0 and black color corresponds to logical value 1). Such code may be an identifier of the settings, here the identifier 32802.

According to the invention, when an initial radio communication setup is required between a managing node, that is to say, here, a node comprising the master projector, and a node comprising a slave projector, for example following the powering up of the slave node, the slave node receives setup information by radio communication means and transmits information by projecting sub-images.

Figure 4:
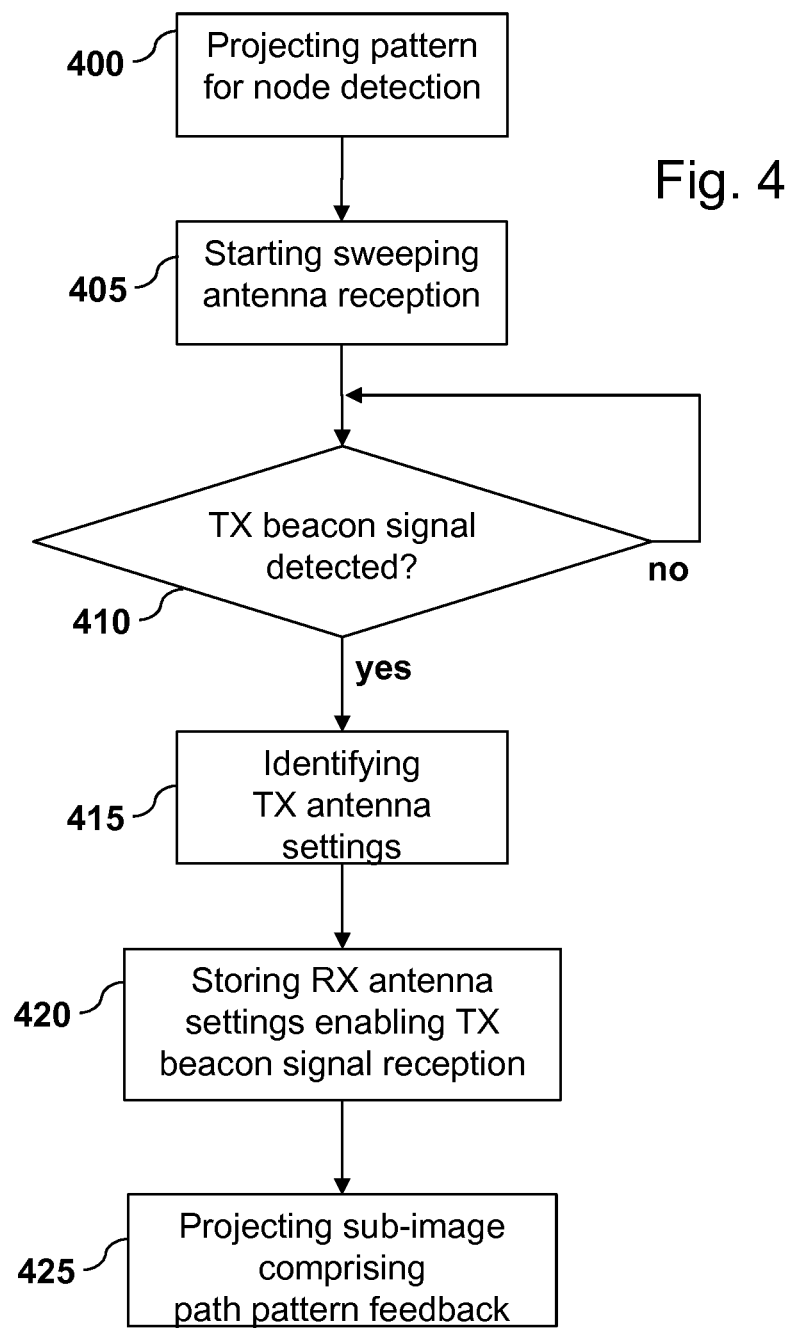
FIG. 4 illustrates an example of steps carried out by a node comprising a slave projector according to an embodiment.
Figure 5:
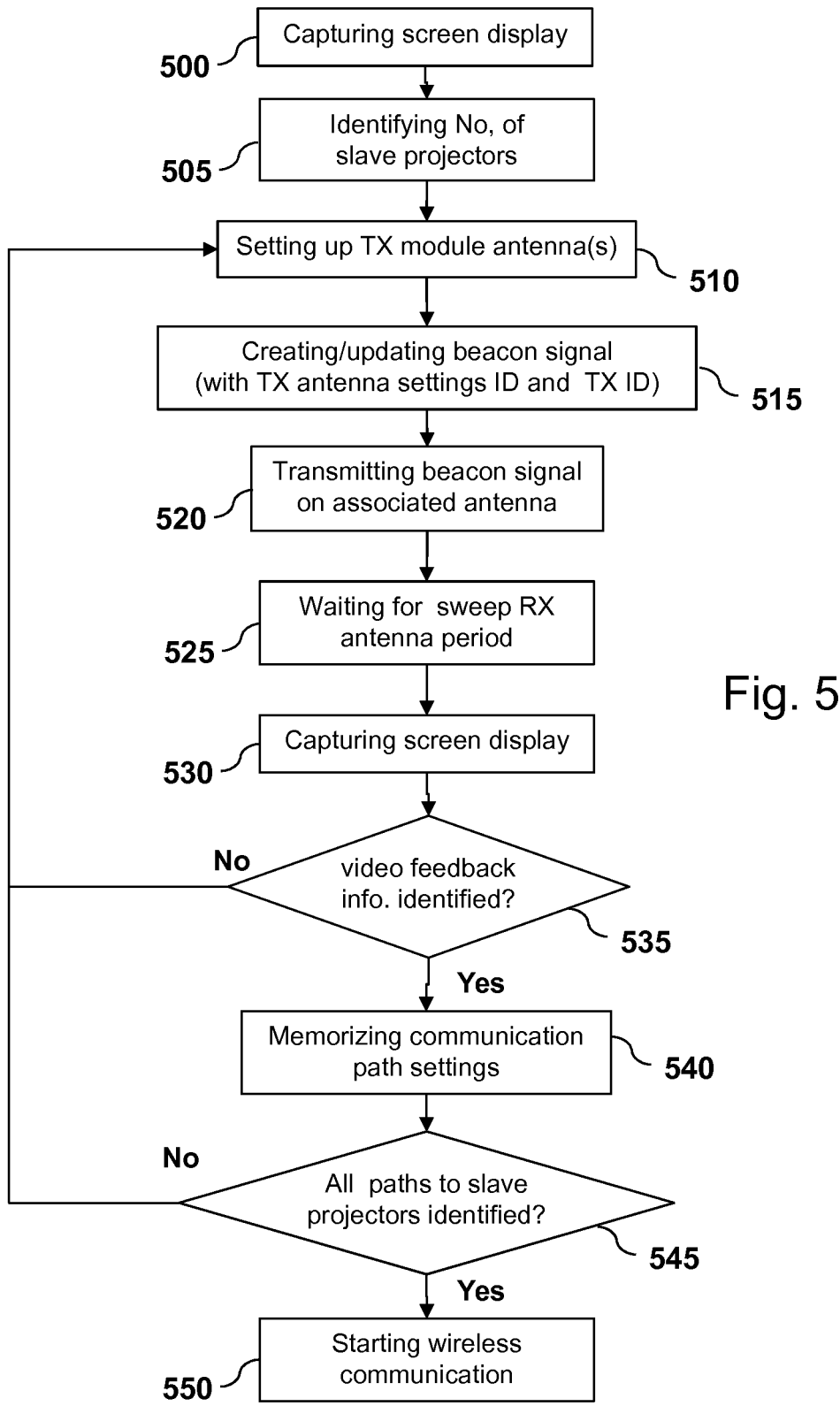
FIG. 5 illustrates an example of steps carried out by a node comprising a master projector according to an embodiment.

To that end, algorithms are implemented in both nodes. FIG. 4 illustrates an example of steps carried out by the node comprising the slave projector and FIG. 5 illustrates an example of steps carried out by the node comprising the master projector. The algorithms implemented in the nodes comprising the slave projectors are typically executed in a parallel way.

As illustrated in FIG. 4, a first step (step 400), in a node comprising a slave projector such as projectors 105-2 to 105-4, referred to as a receiving node, consists in displaying an initial pattern enabling the detection of that node by another node, typically the node comprising the master projector. This is done by projecting a sub-image comprising such an initial pattern. Such a step can be automatically executed when the node is powered up. The initial pattern may consist of a simple predetermined shape of uniform color, such as a green rectangle. It does not need to comprise any specific information. The initial pattern is preferably isolated in the projected sub-image so as to be easily identifiable.

Next (or simultaneously), a sweeping sequence is launched on the receiving node (step 405). Such a sweeping sequence concerns each of the receiving antennas of the receiving node and/or each of the predetermined receiving antenna settings. To that end, a receiving antenna and/or a receiving antenna setting, for example an antenna reception angle, is selected on a regular periodic cycle basis. After having activated (and setup if needed) a receiving antenna, the receiving node checks for the reception of a predetermined beacon signal that is typically issued by the master node (step 410), referred to as TX beacon signal.

According to a first embodiment, the activated receiving antenna checks TX beacon signal reception according to a minimal reception signal strength that can be estimated by the corresponding RSSI level (acronym of Radio Signal Strength Indication). The first activated antenna and/or antenna setting allowing the reception of the TX beacon signal according to the minimal reception level is selected. This allows the detection of a minimal path.

Alternatively, in a second embodiment, the antennas of a set of all or some of the receiving antennas are activated (and are set up if needed), preferably sequentially, and the receiving node selects from among the antennas of that set the one enabling the best reception of the TX beacon signal, that is to say the one providing the best RSSI for receiving the TX beacon signal. This allows the detection of an optimal path. Similarly, antenna settings may be changed to select from among the settings the one enabling the best reception of the TX beacon signal.

The selected antenna and/or antenna settings is advantageously the one selected according to the minimal path detection (i.e. the first activated antenna whose RSSI of the received beacon signal reaches a given threshold) so as to optimize the time period of the setup during initial access setup. Moreover, an optimization of the communication path may be conducted later on.

Once the TX beacon signal has been detected by the receiving node, information relating to the transmitter, typically the master node, is extracted from the received TX beacon signal (step 415). The extracted information advantageously comprises an identifier of the settings of the antenna used for transmitting the received TX beacon signal or other data allowing identification of those settings.

Next, in a following step, the receiving node stops the sweeping sequence launched at step 405 and memorizes the settings of the selected antenna (RX antenna), typically position parameters, and of the radio reception module of the receiving node enabling the reception of the TX beacon signal (step 420). Such settings memorization is advantageously done by setting up the receiving antenna 245 and the dispatch module 225 appropriately, enabling further wireless communication with the node that emitted the TX beacon signal, which is typically the master node.

After having obtained information related to the transmitter and memorized settings relating to the receiver, the receiving node creates a sub-image to be projected, which preferably comprises an identifier of the receiving node and an identifier of the settings of the transmitter antenna, as described by reference to FIG. 3b, and projects the created sub-image (step 425). Accordingly, the projected pattern represents information of the transmitter allowing the latter to associate settings to be used for the transmitting antenna with a receiving node.

FIG. 5 illustrates an example of steps carried out by the master node comprising the master projector to initiate a wireless communication with a node comprising a slave projector. As illustrated, a first step consists in capturing the screen display (step 500), that is to say obtaining a picture of the projection area such as the projection area 300. Such a step is typically performed after powering up the master node and waiting a predetermined period of time allowing the nodes comprising slave projectors to launch their initialization algorithms such as the one described by reference to FIG. 4 so that each slave projector of the projection system projects a sub-image comprising an initial pattern. The screen display comprising initial patterns can be captured by the camera 115 in FIG. 1.

Next, the number of slave projectors used in the projection system is determined (step 505). This is preferably done by counting the number of initial independent patterns in the captured image. This enables the master node to determine how many sub-images (or feedback paths) are to be analysed for setting up a wireless communication path with each slave node.

In a following step, the master node sets each of its transmission antennas in a predetermined configuration, typically an initial known position (step 510). As described previously, each wireless communication module of the master node is preferably connected to at least one dedicated transmission antenna whose settings, typically comprising position settings, can be identified by an identifier.

After having set up the antennas of the master node, a beacon signal is created or updated, preferably for each antenna of each wireless communication module of the master node. Similarly to the example given by reference to FIG. 3b, each beacon signal comprises at least two information fields, one being used for storing an identifier of the master node and the other being used for storing an identifier of the antenna settings of the antenna that is to be used for transmitting the beacon signal.

The identifier of the master node can be used by a slave node receiving the beacon signal to establish a reliable wireless communication between the nodes. As described above, the identifier of the antenna settings of the master node is retransmitted, if required, from the slave node that received the beacon signal to the master node as feedback information for setting up the wireless communication.

Next, the created or updated beacon signals are transmitted by the corresponding wireless communications modules and antennas (step 520) and the master node is set in a waiting state for a predetermined time period (step 525). The latter enables the slave nodes of the projection system to determine, in a sweeping sequence period (steps 405 and following of FIG. 4), whether settings of receiving antennas (RX antennas) allow the reception of the beacon signal.

According to a particular embodiment, the predetermined time period that corresponds to the sweeping period is determined as a function of the number of receiving antenna settings (typically of receiving antenna positions) and of the time period needed for a slave node to detect a beacon signal. Such a predetermined time period may therefore be expressed as follow, $$\text{time period} = R \times T\text{check\_beacon\_reception}$$

where R is the number of receiving antenna settings (typically of receiving antenna positions) and Tcheck_beacon_reception is the time period needed for a slave node to detect a beacon signal.

For the sake of example, if a beacon signal is to be transmitted each t milliseconds, Tcheck_beacon_reception must be at least equal to t milliseconds so that an emitted beacon signal can be detected. Accordingly, if there exist R antenna settings or positions for the receiving antenna, the time period requested for checking the reception of a beacon signal for each possible setting is R×t milliseconds.

It is to be noted that if the number of antenna settings is not the same for all the slave node of the projection system, the predetermined time period is preferably determined as a function of the greater number of receiving antenna settings for all the slave nodes.

As described previously by reference to step 425 of FIG. 4, a sub-image comprising an identifier of a slave node and an identifier of the settings of the antenna of the master node can be projected by each slave projector during the sweeping sequence, that is to say during the predetermined time period.

Once the predetermined time period has elapsed, a picture of the screen display is taken (step 530), for example using the image acquisition device 115 described by reference to FIG. 1. The acquired image may comprise information relative to wireless communication paths that can be used between the master node and the slave nodes, encoded as patterns.

Next, the acquired image is analysed to determine if it contains information relative to wireless communication paths that can be used between the master node and a slave node, that is to say video feedback information. Such analysis can be conducted, for example, by comparing the image acquired at step 500, comprising initial patterns and the last acquired image.

If the last acquired image does not contain information relative to wireless communication paths that can be used between the master node and a slave node, the master node determines new antenna settings and the steps 510 to 535 are repeated with the new antenna settings.

On the other hand, if the last acquired image contains information relative to wireless communication paths that can be used between the master node and a slave node, the patterns are extracted from the last acquired image to retrieve the encoded information that is to say an identifier of a slave node and an identifier of the antenna settings of the master node that allowed the slave node to receive the corresponding beacon signal. To that end, the extracted patterns are analyzed according to the encoding scheme that is used by the slave nodes.

The retrieved identifiers, combined with the antenna settings memorized in the corresponding slave node, define a wireless communication path (or initial medium access). Accordingly, the retrieved identifier of a slave node and the corresponding antenna settings of the master node are memorized by the latter (step 540), for example in an internal table of the master node. These items of information are used for subsequent communication with the corresponding slave node.

Next, a test is performed to determine whether or not a wireless communication path has been identified for each of the slave nodes (step 545). This can be done by comparing the number of identified wireless communication paths with the number of slave nodes identified at step 505. If there exist one or more slave nodes for which no wireless communication path has been identified, the steps 510 to 540 are repeated.

On the other hand, if a wireless communication path has been identified for each of the slave nodes, the process ends at step 550 according to which a radio communication is initiated between a master node and slave nodes.

Figure 6:
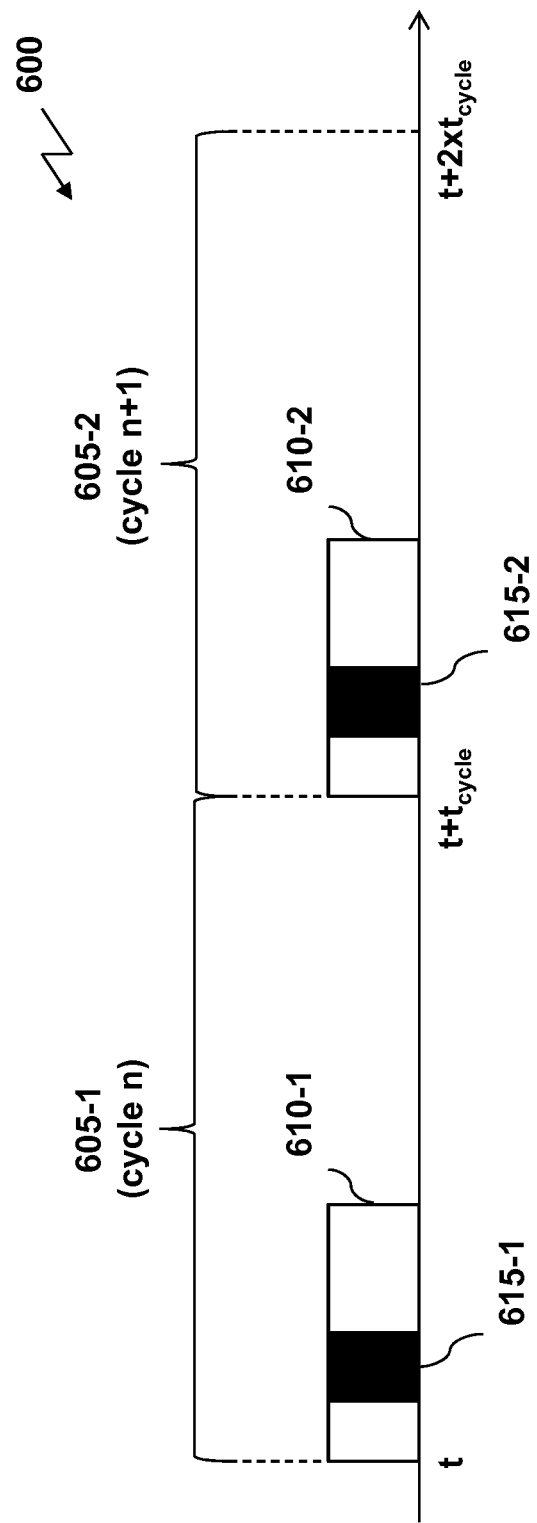
FIG. 6 illustrates transmission of beacon signals from a master node to slave nodes to initiate a radio communication path between these nodes.

FIG. 6 illustrates transmission of beacon signals from a master node to slave nodes to initiate a radio communication path between these nodes. More precisely, the time diagram 600 represents periodic cycles, in particular cycle n (605-1) and cycle n+1 (605-2), during which beacon signals are transmitted. For example beacon signal 610-1 is transmitted at time t, during cycle 605-1, while beacon signal 610-2 is transmitted at time $t+t_{cycle}$, during cycle 605-1, $t_{cycle}$ being the period of each cycle.

It is noted here that a beacon signal used during the setup of a radio communication path is a radio signal comprising items of information that are transmitted, in particular, to enable physical synchronisation and reception of a radio signal.

According to the invention, a beacon signal further comprises specific information for a supporting medium access configuration algorithm. As described previously, the specific information is preferably stored in two specific fields which contain an identifier of the master node and an identifier of the transmission antenna settings currently used by the master node transmitting the beacon signal. For example, beacon signals 610-1 and 610-2 comprise specific fields 615-1 and 615-2, respectively, that comprise these identifiers.

The beacon signal transmitted at each cycle corresponds to particular settings of the antenna used for transmitting the beacon signal. Accordingly, if the identifiers of the master node are the same in the specific fields 615-1 and 615-2, the identifiers of the antenna settings of the master node are different.

As described previously, these identifiers are extracted from the beacon signal after it is received by a slave node in order to provide feedback information by projecting sub-images containing a representation of the feedback information. Again, as described previously, feedback information preferably comprises an identifier of the slave node from which it is projected and settings of the antenna from which the corresponding beacon signal has been received.

Even though the previous description mainly concerns a projection system in which a wireless communication module is assigned to each projector, a single wireless communication module can be assigned to several projectors. In such a case, only one projector associated with a given wireless communication module is used for initial setting up of the corresponding wireless communication path.

Naturally, in order to satisfy local and specific requirements, a person skilled in the art may apply to the solution described above many modifications and alterations all of which, however, are included within the scope of protection of the invention as defined by the following claims. In particular, while the described embodiments relate, for the sake of clarity, to direct radio transmissions from a master note to slave nodes for configuring wireless communication paths, other embodiments relate to indirect radio transmissions from a master note to slave nodes, for example a radio transmission from a master note to a particular slave node via another slave node, the latter carrying out or not a process of searching for communication settings.

The invention claimed is:

1. A method to configure a projection system for projecting a video stream on a projection area, wherein the projection system includes a master node and at least one slave node configured to communicate with each other over a wireless communication network, wherein each of the master node and the at least one slave node includes at least one wireless communication module and at least one video projector, and wherein the wireless communication network includes at least one wireless communication path, the method at the master node comprising:

emitting, using at least one wireless communication module of the master node configured with at least one configuration parameter of the master node, a beacon signal, wherein the at least one configuration parameter is to configure a wireless communication path between the master node and the at least one slave node and wherein the beacon signal includes at least one item of information characterizing the at least one configuration parameter;

obtaining an image of the projection area, wherein the image is projected by the at least one video projector of the at least one slave node that received the emitted beacon signal;

analyzing the obtained image to determine whether the obtained image includes, as path pattern feedback, encoded data associated with the at least one item of information;

decoding, if it is determined that the obtained image includes the encoded data associated with the at least one item of information, the encoded data to obtain the at least one item of information characterizing the at least one configuration parameter; and setting up the at least one wireless communication module of the master node as a function of the at least one item of information received from the at least one slave node to configure a wireless communication path between the master node and the at least one slave node, wherein each beacon signal comprises at least two information fields, one being used for storing an identifier of the master node and the other being used for storing an identifier of an antenna settings of an antenna that is to be used for transmitting the beacon signal.

2. The method of claim 1, further comprising:
modifying the at least one configuration parameter of the at least one wireless communication module of the master node if it is determined that the obtained image does not include the encoded data associated with the at least one item of information; and
repeating the steps of emitting a beacon signal, obtaining an image, and analyzing the obtained image until it is determined that the obtained image includes the encoded data associated with the at least one item of information.

3. The method of claim 1, wherein obtaining an image of the projection area is carried out following a predetermined time period after emitting the beacon signal is carried out.

4. The method of claim 1, before emitting the beacon signal, the method further comprising:
obtaining an initial image of the projection area; and
analyzing the obtained initial image to identify a number of slave nodes of the projection system,
wherein emitting the beacon signal, decoding the encoded data, and setting up the at least one wireless communication module of the master node are carried out for each identified slave node of the projection system.

5. The method of claim 1, before emitting the beacon signal, the method further comprising setting up the wireless communication module of the master node according to the at least one configuration parameter.

6. The method of claim 1, wherein at least one of the wireless communication modules includes a configurable directional antenna.

7. The method of claim 1, wherein the encoded data includes an identifier making it possible to identify the wireless communication module of the master node used for emitting the beacon signal.

8. The method of claim 1, wherein the encoded data includes an identifier of the at least one slave node.

9. The method of claim 1, wherein the encoded data includes channel frequency settings.

10. A method for configuring a projection system for projecting a video stream on a projection area, wherein the projection system includes a master node and at least one slave node configured to communicate with each other over a wireless communication network, wherein each of the master node and the at least one slave node includes at least one wireless communication module and at least one video projector, and wherein the wireless communication network includes at least one wireless communication path, the method at the at least one slave node comprising:
receiving a beacon signal from the master node, via the wireless communication module of the at least one slave node, wherein the beacon signal includes at least one item of information characterizing at least one configuration parameter of the wireless communication module of the master node, and wherein the at least one configuration parameter is to configure a wireless communication path between the master node and the at least one slave node;
encoding, upon reception of the beacon signal, the at least one item of information;
creating a sub-image including encoded data resulting from encoding the at least one item of information, wherein the encoded data is associated with the at least one item of information as path pattern feedback; and
displaying the created sub-image on the projection area such that the master node can obtain the sub-image,
wherein each beacon signal comprises at least two information fields, one being used for storing an identifier of the master node and the other being used for storing an identifier of an antenna settings of an antenna that is to be used for transmitting the beacon signal.

11. The method of claim 10, before receiving the beacon signal, the method further comprising:
modifying at least one setting of the wireless communication module of the at least one slave node; and
attempting receiving the beacon signal.

12. The method of claim 11, wherein modifying the at least one setting of the wireless communication module is repeated according to a sweeping sequence.

13. The method of claim 12, wherein the at least one setting of the wireless communication module is modified repeatedly until the beacon signal is received from the master node with a strength that reaches a predetermined threshold.

14. The method of claim 12, wherein the at least one item of information encoded in the created sub-image is at least one item of information enabling the best reception of the beacon signal.

15. The method of claim 11, wherein the at least one setting of the wireless communication module of the at least one slave node includes a position of an antenna of the master node emitting the received beacon signal.

16. The method of claim 10, wherein creating the sub-image includes creating, in the created sub-image, a representation of an identifier of the at least one slave node.

17. A method for configuring a projection system for projecting a video stream on a projection area, wherein the projection system includes a master node and at least one slave node configured to communicate with each other over a wireless communication network, wherein each of the master node and the at least one slave node includes at least one wireless communication module and at least one video projector, and wherein the wireless communication network includes at least one wireless communication path, the method comprising:
emitting a beacon signal, using at least one wireless communication module of the master node, wherein the beacon signal includes at least one item of information characterizing at least one configuration parameter of the at least one wireless communication module of the master node, and wherein the at least one configuration parameter is to configure a wireless communication path between the master node and the at least one slave node;
receiving the beacon signal from the master node, in the at least one slave node, via the wireless communication module of the at least one slave node;
encoding, upon reception of the beacon signal, the at least one item of information;
creating, in the at least one slave node, a sub-image including encoded data resulting from encoding the at least one item of information, wherein the encoded data is associated with the at least one item of information;
displaying the created sub-image on the projection area;
obtaining, in the master node, an image of the projection area, wherein the image is projected by at least one video projector of the at least one slave node that received the emitted beacon signal;
analyzing, in the master node, the obtained image to determine whether the obtained image includes, as path pattern feedback, encoded data associated with the at least one item of information;
decoding, if it is determined that the obtained image includes the encoded data associated with the at least one item of information, the encoded data to obtain the at least one item of information characterizing the at least one configuration parameter; and setting up the at least one wireless communication module of the master node as a function of the at least one item of information to configure a wireless communication path between the master node and the at least one slave node, wherein each beacon signal comprises at least two information fields, one being used for storing an identifier of the master node and the other being used for storing an identifier of an antenna settings of an antenna that is to be used for transmitting the beacon signal.

18. The method of claim 17, further comprising:

modifying the at least one configuration parameter of the at least one wireless communication module of the master node if it is determined that the obtained image does not include the encoded data associated with the at least one item of information; and repeating the steps of emitting a beacon signal, obtaining an image, and analyzing the obtained image until it is determined that the obtained image includes the encoded data associated with the at least one item of information.

19. The method of claim 17, before receiving the beacon signal, the method further comprising:

modifying at least one setting of the wireless communication module of the at least one slave node; and attempting receiving the beacon signal.

20. The method of claim 19, wherein obtaining an image of the projection area in the master node is carried out after a predetermined time period after emitting the beacon signal is carried out.

21. The method of claim 17, wherein creating the sub-image includes creating, in the created sub-image, a representation of an identifier of the at least one slave node.

22. The method of claim 17, wherein at least one sub-image displayed on the projection area includes codes representing at least the at least one item of information, and wherein decoding, in the master node, encoded data associated with the at least one item of information including decoding the codes.

23. The method of claim 22, wherein the codes are codes of the barcode type.

24. The method of claim 17, after configuring the wireless communication path between the master node and the at least one slave node, the method further comprising transmitting sub-images from the master node to each of the at least one slave node using initiated wireless communication paths to project a composite image on the projection area.

25. In a projection system for projecting a video stream on a projection area and having at least one slave node, a master node comprising:

at least one video projector;

at least one wireless communication module configured with at least one configuration parameter of the master node and configured to emit, to the at least one slave node over a wireless communication network having at least one wireless communication path, a beacon signal, wherein the at least one configuration parameter is to configure a wireless communication path between the master node and the at least one slave node and wherein the beacon signal includes at least one item of information characterizing the at least one configuration parameter;

an image acquisition device configured to obtain an image of the projection area, wherein the image is projected by at least one video projector of the at least one slave node that received the emitted beacon signal;

a controller configured to determine whether the obtained image includes, as path pattern feedback, encoded data associated with the at least one item of information, wherein, if it is determined that the obtained image includes the encoded data associated with the at least one item of information, the controller decodes the encoded data to obtain the at least one item of information characterizing the at least one configuration parameter and sets up the at least one wireless communication module of the master node as a function of the at least one item of information received from the at least one slave node to configure a wireless communication path between the master node and the at least one slave node, wherein each beacon signal comprises at least two information fields, one being used for storing an identifier of the master node and the other being used for storing an identifier of an antenna settings of an antenna that is to be used for transmitting the beacon signal.

26. The master node of claim 25, wherein, if it is determined that the obtained image does not include the encoded data associated with the at least one item of information, the controller modifies the at least one configuration parameter of the at least one wireless communication module of the master node, the at least one wireless communication module repeats emitting the beacon signal, the image acquisition device repeats obtaining the image of the projection area, and the controller repeats determining whether the obtained image includes encoded data associated with the at least one item of information.

27. The master node of claim 25, wherein the image acquisition device further is configured to obtain the image of the projection area following a predetermined time period after the at least one wireless communication module emits the beacon signal.

28. The master node of claim 25, wherein, before the least one wireless communication module emits the beacon signal, the image acquisition device obtains an initial image of the projection area, and the controller analyzes the obtained initial image to identify a number of slave nodes of the projection system, wherein, for each identified slave node of the projection system, the least one wireless communication module emits a beacon signal, the controller decodes encoded data, and the controller sets up the at least one wireless communication module of the master node.

29. The master node of claim 25, wherein, before the least one wireless communication module emits the beacon signal, the controller sets up the wireless communication module of the master node according to the at least one configuration parameter.

30. In a projection system for projecting a video stream on a projection area and having a master node, a slave node comprising:

at least one wireless communication module configured to receive, from the master node over a wireless communication network having at least one wireless communication path, a beacon signal, wherein the beacon signal includes at least one item of information characterizing at least one configuration parameter of the at least one wireless communication module of the master node, and wherein the at least one configuration parameter is to configure a wireless communication path between the master node and the slave node;

a controller configured to encode, upon reception of the beacon signal, the at least one item of information and create a sub-image including encoded data resulting from encoding the at least one item of information, wherein the encoded data is associated with the at least one item of information as path pattern feedback; and at least one video projector configured to display the created sub-image on the projection area such that the master node can obtain the sub-image, wherein each beacon signal comprises at least two information fields, one being used for storing an identifier of the master node and the other being used for storing an identifier of an antenna settings of an antenna that is to be used for transmitting the beacon signal.

31. The slave node of claim 30, before the at least one wireless communication module receives the beacon signal, the controller modifies at least one setting of the wireless communication module of the slave node, and the at least one wireless communication module attempts receiving the beacon signal.

32. The slave node of claim 30, wherein the controller repeatedly modifies the at least one setting of the wireless communication module until the beacon signal is received from the master node with a strength that reaches a predetermined threshold.

33. A projection system for projecting a video stream on a projection area, the projection system comprising:

a master node; and at least one slave node configured to communicate with the master node over a wireless communication network, wherein each of the master node and the at least one slave node includes at least one wireless communication module and at least one video projector, and wherein the wireless communication network includes at least one wireless communication path, wherein the at least one wireless communication module of the master node is configured to emit a beacon signal that includes at least one item of information characterizing at least one configuration parameter of the at least one wireless communication module of the master node, and wherein the at least one configuration parameter is to configure a wireless communication path between the master node and the at least one slave node, wherein the wireless communication module of the at least one slave node is configured to receive the beacon signal from the master node, wherein a controller of the at least one slave node is configured to encode, upon reception of the beacon signal, the at least one item of information and create, in the at least one slave node, a sub-image including encoded data resulting from encoding the at least one item of information, wherein the encoded data is associated with the at least one item of information, wherein the at least one video projector of the at least one slave node is configured to display the created sub-image on the projection area, wherein an image acquisition device of the master node is configured to obtain an image of the projection area, wherein the image is projected by at least one video projector of the at least one slave node that received the emitted beacon signal, wherein a controller of the master node is configured to determine whether the obtained image includes, as path pattern feedback, encoded data associated with the at least one item of information, wherein, if it is determined that the obtained image includes the encoded data associated with the at least one item of information, the controller of the master node decodes the encoded data to obtain the at least one item of information characterizing the at least one configuration parameter and sets up the at least one wireless communication module of the master node as a function of the at least one item of information to configure a wireless communication path between the master node and the at least one slave node, wherein each beacon signal comprises at least two information fields, one being used for storing an identifier of the master node and the other being used for storing an identifier of an antenna settings of an antenna that is to be used for transmitting the beacon signal.

34. The projection system of claim 33, wherein, if it is determined that the obtained image does not include the encoded data associated with the at least one item of information, the controller of the master node modifies the at least one configuration parameter of the at least one wireless communication module of the master node, the at least one wireless communication module of the master node repeats emitting the beacon signal, the image acquisition device of the master node repeats obtaining the image of the projection area, and the controller of the master node repeats determining whether the obtained image includes encoded data associated with the at least one item of information.

35. The projection system of claim 33, before the at least one wireless communication module of the at least one slave node receives the beacon signal, the controller of the at least one slave node modifies at least one setting of the wireless communication module of the at least one slave node, and the at least one wireless communication module of the at least one slave node attempts receiving the beacon signal.

* * * * *